(12) United States Patent
Li et al.

(10) Patent No.: US 9,286,910 B1
(45) Date of Patent: Mar. 15, 2016

(54) SYSTEM FOR RESOLVING AMBIGUOUS QUERIES BASED ON USER CONTEXT

(71) Applicant: Amazon Technologies, Inc., Reno, NV (US)

(72) Inventors: Meng Li, San Francisco, CA (US); Duncan Joseph Reynolds, Cambridge (GB); William Tunstall-Pedoe, Cambridge (GB); Petra Elisabeth Holmes, Over (GB); Robert Peter Stacey, Essex (GB); David Spike Palfrey, Cambridge (GB); Andrew Graham Fenn, Cambridge (GB); Mark Rafn, Cambridge (GB); Graham John French, East Sussex (GB)

(73) Assignee: AMAZON TECHNOLOGIES, INC., Reno, NV (US)

( * ) Notice: Subject to any disclaimer, the term of this patent is extended or adjusted under 35 U.S.C. 154(b) by 24 days.

(21) Appl. No.: 14/208,700

(22) Filed: Mar. 13, 2014

(51) Int. Cl.
*G10L 25/48* (2013.01)

(52) U.S. Cl.
CPC .................................... *G10L 25/48* (2013.01)

(58) Field of Classification Search
CPC ....................................................... G10L 25/48
USPC .................................................. 704/269–277
See application file for complete search history.

(56) References Cited

U.S. PATENT DOCUMENTS

2011/0307435 A1* 12/2011 Overell et al. ................... 706/46
2014/0074466 A1* 3/2014 Sharifi et al. ................... 704/235

OTHER PUBLICATIONS

Hoskins, Curtis. Gracenote and your Blu-ray Disc Player. Yahoo Voices. Feb. 17, 2011. http://voices.yahoo.com/gracenote-blu-ray-disc-player-7881784.html.
BD-Live (Bonus Content Downloads). Sony South Africa. Archived Oct. 26, 2011. https://www.sony.co.za/article/278405/section/product/product/bdp-s470.
How Does X-Ray Work? X-Ray for Movies & TV by IMDb. Downloaded Feb. 7, 2014. http://www.imdb.com/x-ray/.
Zeebox FAQ. Zeebox, Archived Jan. 27, 2014. http://zeebox.com/help/help-faq.
Zeebox App Tags TV As You Watch. Stuff. Nov. 1, 2011. http://www.stuff.tv/zeebox/app-tags-tv-you-watch/news.

* cited by examiner

*Primary Examiner* — Marcellus Augustin
(74) *Attorney, Agent, or Firm* — Seyfarth Shaw LLP; Ilan N. Barzilay; David A. Klein

(57) ABSTRACT

A system for resolving a user's question regarding media at the user's location where the question includes ambiguity as to the context of the question. Context information is acquired from a device or devices at the user's location, and if multiple possible contexts are identified, the system may attempt to resolve the question for more than one of the possible contexts. The system for answering questions and the source of the media may be different and independent.

26 Claims, 5 Drawing Sheets

SYSTEM FOR RESOLVING AMBIGUOUS QUERIES BASED ON USER CONTEXT

BACKGROUND

Reference tools that provide on-demand information about media such as books and movies are becoming increasingly common. When someone is reading or watching something, they can refer to the reference tool if they would like more information. The reference tool may be provided by the device displaying the media or may be provided by a separate device such as a smart phone or tablet computer. Some reference tools are embedded with the media, while others require a network connection to obtain information.

BRIEF DESCRIPTION OF DRAWINGS

For a more complete understanding of the present disclosure, reference is now made to the following description taken in conjunction with the accompanying drawings.

DETAILED DESCRIPTION

On-demand reference tools provide media viewers and e-book readers with supplemental facts, information, and trivia about media being watched or read. These tools have generally fallen into one of two categories: generalized tools that interpret user questions and attempt to provide specific answers, but which have a limited capacity to interpret context from a user's perspective when resolving an answer, and media-specific tools supporting a single identified work or composition, providing context-specific information but with little or no capacity to interpret user questions.

Inline reference tools such as Amazon's "X-Ray" and Sony's "MovieIQ" provide on-demand reference information that further describe a specific scene or passage of media, such as displaying the cast members in a current scene of a film and providing links to the cast member's biographies. However, the media and reference information are linked to a particular source and to a particular work or composition, such as to a streamed movie (e.g., via a Kindle player) or to a movie being played back from interactive media (e.g., the BD-Live service provided by Blu-ray disc players), and provide a user unfiltered information, leaving it to the user to resolve the answer to any specific question.

"Second-screen" applications can decouple the reference tool from the media source, using a microphone to sample audible content to determine context. Examples include Shazam's music identification service and Zeebox's social television platform. However, while such services decouple the media and reference sources, the reference information they provide is still linked to a single identified composition, and it is still left to the user to resolve the answer to any specific question.

Generalized tools also decouple the reference tool from the media source. For example, speech-based intelligent assistants such as Evi, Apple's "Siri" and "Google Now" provide generalized answers not linked to a particular work or composition. However, other than device location, these platforms possess limited information about the user's current perspective beyond any context provided by words in a user's question, hindering their ability to correctly resolve ambiguity common in ordinary speech.

Efforts to improve language interpretation algorithms have incrementally increased the ability of software-driven "agents" and "assistants" to interpret meaning, but even when these systems have access to the same databases utilized by media-specific tools, their ability to resolve ambiguity in a question continues to hinder their utility. Something as simple as use of a pronoun out-of-context can stymie a computer or cause it to produce a nonsensical answers.

Figure 1:
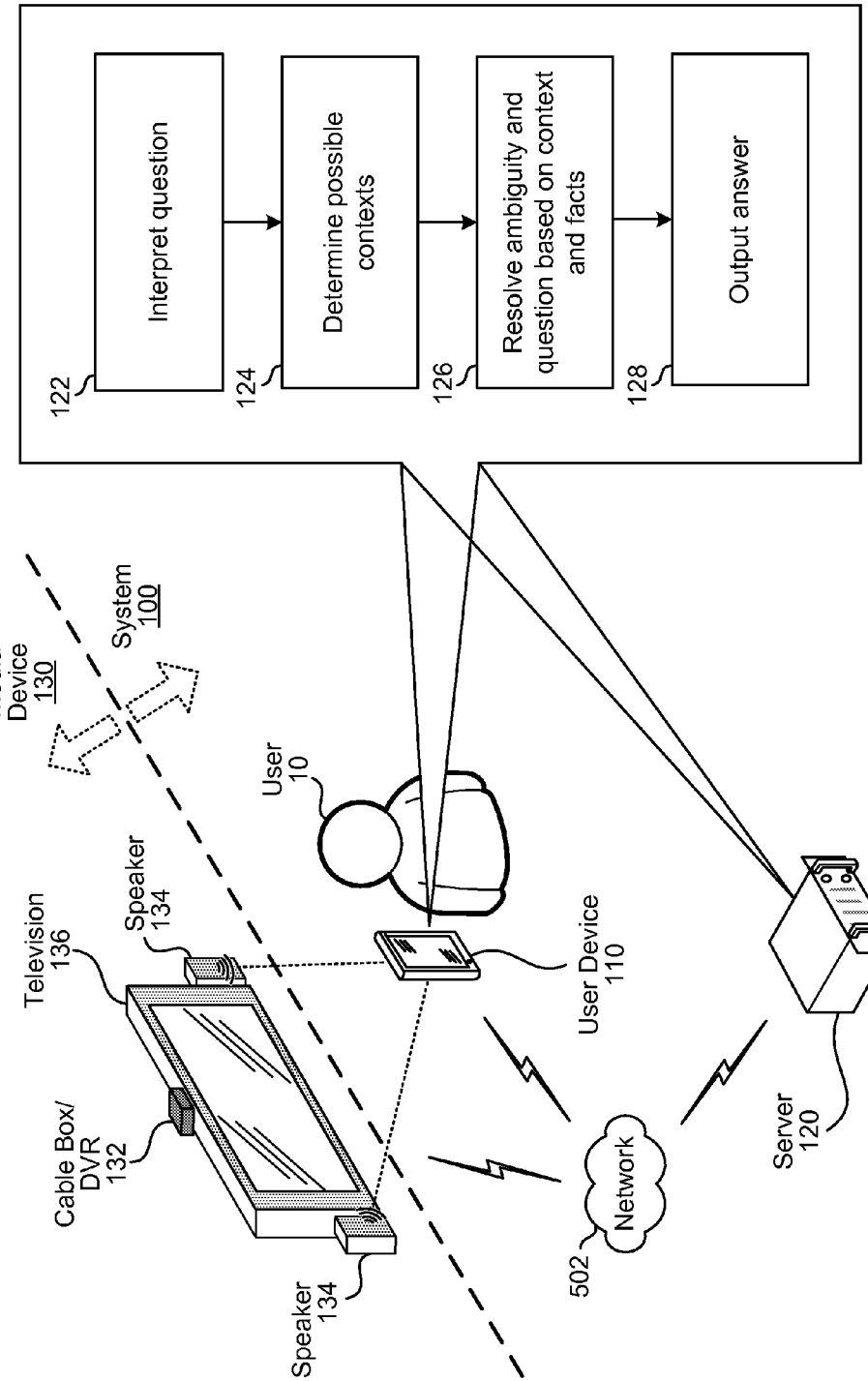
FIG. 1 illustrates a system for resolving ambiguous queries based on user context.

FIG. 1 illustrates an example of a system 100 that uses context awareness and linguistic anaphora processing to resolve ambiguity, providing specific answers to user questions independent of media source. Probable contexts for a user question may be determined by querying devices (e.g., media device 130) nearby a user device 110 for information about current content, by using device sensors on or proximate to a user device 110 to sample user surroundings (e.g., audio, video), by determining what media-related applications are running on the user device 110 itself, and by analysis of available information about the user 10 associated with the user device 110. Anaphora, which is the interpretation of an expression based upon an antecedent or postcedent expression providing context, is then applied to interpret the meaning behind a user's question, thereby resolving ambiguity. Unlike existing systems, by combining context with anaphora, even questions containing ambiguous pronouns such as "who is he?" may be resolved.

The user device 110, such as a mobile telephone, tablet computer, etc., is associated with a user 10 and is configured to receive "natural language" search queries from the user. These queries may be typed or be spoken utterances. System 100 may use a common protocol for both natural language processing and the characterization of spoken utterances. Speech processing may include automatic speech recognition and natural language processing. Automatic speech recognition (ASR) comprises converting speech into an interpreted result such as text, whereas natural language processing (NLP) comprises determining the meaning of that interpreted result.

The user may provide a signal (e.g., push a button on device 110, speak an "attention" word, etc.) to indicate that an utterance is a spoken question/inquiry to be processed, or the system 100 may constantly "listen" and identify when an utterance is a question. If the system 100 listens for user 10 utterances, NLP heuristics may optionally be used to identify that an utterance is a question based on the use of grammar, such as the use of an interrogative sentence structure, word, or particle, and/or the use of an inflected verb form. As different languages signal that a sentence is a question differently, the NLP heuristics may be language-specific. As an alternative to pre-programmed heuristics, if an utterance is to be recognized as a question, recognition may be performed using more basic features, such as naïve Bayes over n-grams or other generic features. Using such probabilistic modeling techniques may be more language-independent than heuristics because only the training data would need to vary per language.

Once the system 100 receives and identifies a user question, the question is interpreted (122), which includes parsing the question to identify component "objects," to identify relationships between the objects, and to identify which objects are ambiguous without context. In essence, the interpreter of system 100 translates a question into a symbolic construct for processing.

The symbolic construct may be configured according to a number of different syntactical arrangements. For example, the construct may use a syntax that interfaces with a knowledge representation system, such as the knowledge representation systems described in U.S. Pat. No. 7,013,308, filed on Nov. 21, 2001, in the name of Tunstall-Pedoe; U.S. Pat. No. 7,707,160, filed on Dec. 23, 2005, in the name of Tunstall-Pedoe; U.S. Pat. No. 8,219,599, filed on Oct. 17, 2011, in the name of Tunstall-Pedoe; and/or U.S. Patent Application Publication 2011/0307435 A1, filed on May 12, 2011, in the names of Overell et al., the contents of all of which are hereby expressly incorporated herein by reference in their entireties and collectively referred to below as the Incorporated Knowledge System or Incorporated Knowledge System documents.

As used herein, the term "question" refers to any sequence of words in natural language, the purpose of which is to solicit knowledge from the system, as discussed in the Incorporated Knowledge System documents. A question need not necessarily conform to the classic grammatical definition of a question. For example, it could be in imperative form such as "Tell me what the capital of France is" or the meaning could be implied.

For example, the question "How old is that actor?" may be translated to:
query x
[current time] [applies to] now/1
f: x [is the age of] [anaphora: ["that actor"]; [human being]]
f [applies at timepoint] now The interpreter has identified that the statement is a question. The construction (e.g., verb tense with "that") indicates the question is directed at the current moment in time, and that "how old" is the fact to be resolved. However, while "that actor" is identified as referring to a "human being," the contextual meaning phrase is identified as ambiguous, requiring context-based anaphora to resolve.

Possible contexts may be determined (124) by collecting available information prior and/or in response to interpreting the question, and may come from multiple sources. For example the user device 110 may determine what software applications the user 10 is currently using on the user device 110 itself, what applications are in the foreground and/or background, and what media content is currently being provided to the user 10. The user device 110 may also query other networked devices in a network neighborhood (e.g., connected to a same network access point) such as cable box/digital video recorder (DVR) 132 and television 136 to determine what content is currently being provided to the user 10. The user device 110 may also sample audible content, such as the output of speakers 134, to be compared by the system 100 with stored acoustic fingerprints to determine content. Video or images may also be captured by a camera or cameras on user device 110. Context information may also be collected from other devices associated with the user and/or user device 100 such as devices whose output is detected by the sensor(s) of the user device or devices that are determined to be proximate to the user during a relevant time (i.e. time of a question or time referred to in a question). As an example, the system 100 may also lookup other information about the user that may be relevant to determining context, such as paperback books the user 10 is known to have purchased, sports teams the user has demonstrated an interest in, etc. The user device 110 may also determine the context of another media device if the other media device is accessing network-based "cloud" services and/or is sending status updates to a server 120, such as if the user 10 is reading an e-book on a media device and the media device is sending updates to the server 120 indicating that a page was flipped, the furthest page reached, etc. The server 120 may be at a location that is physically remote from both the user device 110 and the media device, or may be co-located with one or both. The book title or other identifier, and a timestamp associated with the last update, may be used to determine that the user 10 is actively reading, what they are reading, and where they are in the book.

For example, based on context information provided by cable box/DVR 132 and/or resolved by the server 120 based on audio sampling, context-related facts may be:
factlist
[fact: ["symbolic.1"]]: [current context object] [resolves using] [fact pattern: ["ABCD123"]; [is the movie database movie id for]; [context object: [movie]; ["0"]]]
[fact: ["symbolic.2"]]: [currently playing movie] [applies to] [current context object]
[fact: ["symbolic.3"]]: [scene with number: ["15"]] [is the currently playing scene of] [current context object]

Other facts may be determined, such as the current time index of the film at the time the query is received. Some facts may already exist as stored facts in the knowledge base or be determined by querying the cable box/DVR 132, such as:
[fact: ["symbolic.4"]]: [character by name: ["susie"]] [is onscreen during] [scene with number: ["15"]]

Other general non-content specific knowledge may already have been imported into the knowledge base from a movie database, or may be uploaded after interpreting the question:
[fact: ["100023"]]: ["ABCD123"] [is the movie database movie id for] [susie and friends]
[fact: ["100024"]]: [John Smith] [played the character in the work] [acting role: ["susie"]; [susie and friends]]
[fact: ["10025"]]: [John Smith] [date of birth: [1952-07-17]]

The system 100 resolves (126) ambiguity in the question by applying context-specific facts to resolve the meaning of ambiguous words, and general facts to resolve the question itself. For example, the translated query can be answered after providing the anaphora resolution:
query x
[anaphora: ["that actor"]; [group: [human being]]] [can resolve to] x This anaphora resolution may be implemented by running a query:
query actor
[anaphora: [current context object]; [movie]] [can resolve to] movie
[currently playing movie] [applies to] movie
scene [is the currently playing scene of] movie
character [is onscreen during] scene
actor [played the character in the work] [acting role: character; movie]
Where the line:
[anaphora: [current context object]; [movie]] [can resolve to] movie
can be implemented using the "resolves using" fact pattern to find the movie satisfying that fact pattern, i.e. in this case having the specified movie database identifier.

Once the context-related ambiguity is resolved, the remaining query may be run as:
f: x [is the age of] [John Smith]
Which can be determined from the date-of-birth information in the knowledge base.

If the ambiguity and the question can be resolved based on more than one of the possible contexts, answers may be prioritized and/or culled based on the immediacy of the context (e.g., if a question may be resolved for both a scene in a movie audible at the user's location and a scene in a book the user recently purchased, the context information for the movie has greater immediacy) and biased to favor the context of recently asked prior questions. If two answers resolve with equal priority bias, both answers may be output. The semantics of the question can also be used to rule out context objects. For example, if the user 10 asked "whose daughter is that actor," then "that actor" could resolve to any of the actors on the screen, but there is the additional constraint of gender which comes from the translated query using [is the daughter of], and the knowledge base(s) (342 in FIG. 3) may have a fact indicating that [parent plus attribute class: [animal]; [female]] [is the left class of] [is the daughter of], i.e. that only females can be daughters.

Contextual ambiguity may be resolved iteratively, in parallel, or in other orders. For example, resolving ambiguity iteratively may start by attempting to resolve for the context with the highest immediacy, and trying other possible contexts if the query will not resolve. In parallel, contextual ambiguity may be resolved by processing for multiple contexts at the same time, and then selecting the context that resolves with an NLP meaning "weight" that most closely matches the meaning associated with the rest of the question. If multiple contexts produce similarly weighted results, other factors such as immediacy and user profile information (e.g., comparing known interests of the user with aggregate user profiles to determine commonality of interest) may be applied to generate a probability set from which a context that resolves is selected.

After the question is resolved, the answer is output (128) to the user's device 110, such as outputting the answer to a display of the user device 110. A grammar framework may be used to convert the answer into conversational language prior to outputting (128) to the user's device 110. A grammar framework may also be applied after the answer is received by the reference query response module 250 discussed below. In addition to the answer, additional related content and/or links to such information may also be provided.

Figure 2:
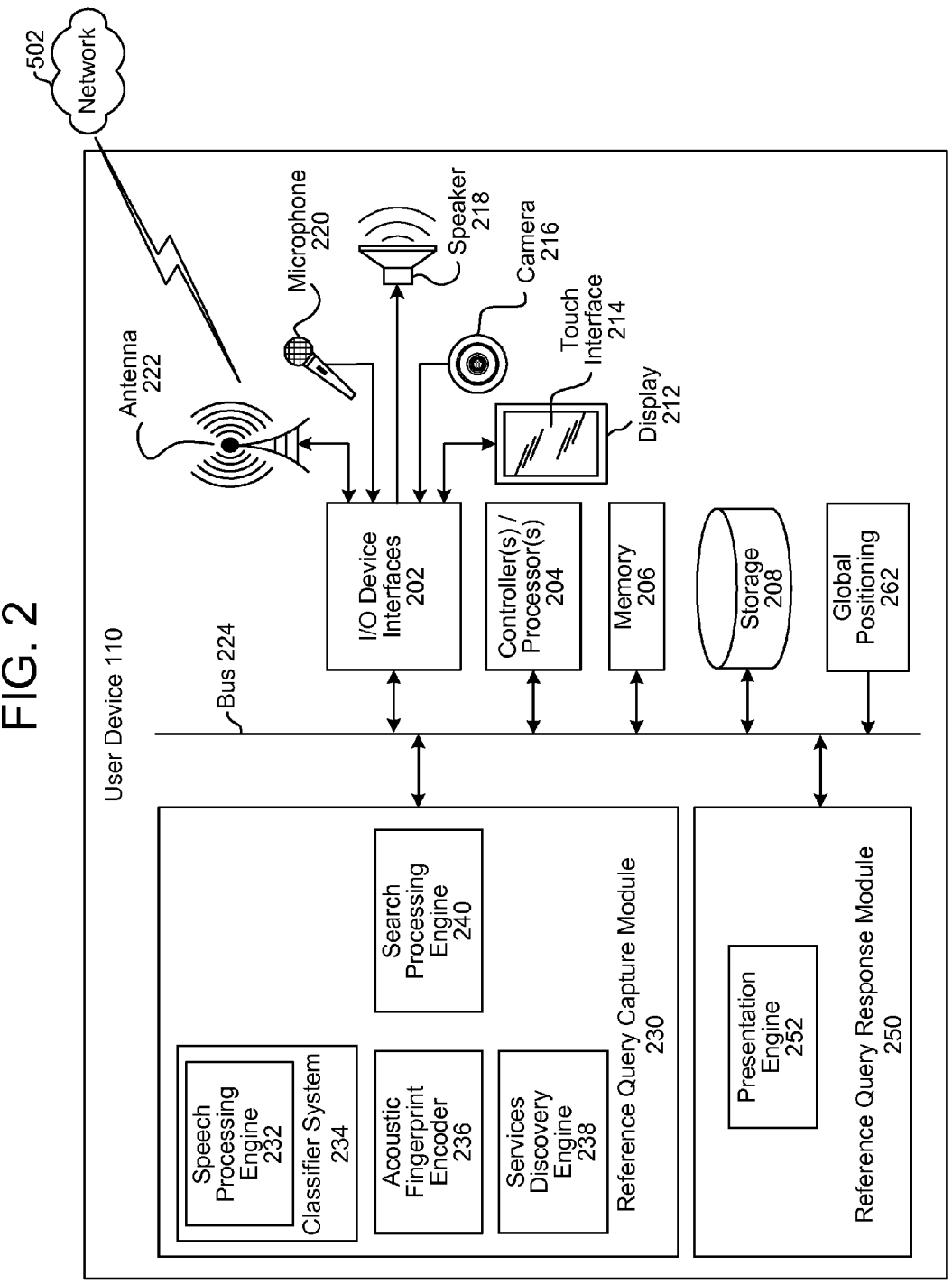
FIG. 2 is a block diagram conceptually illustrating example components of a user device for that may be included in the system.
Figure 3:
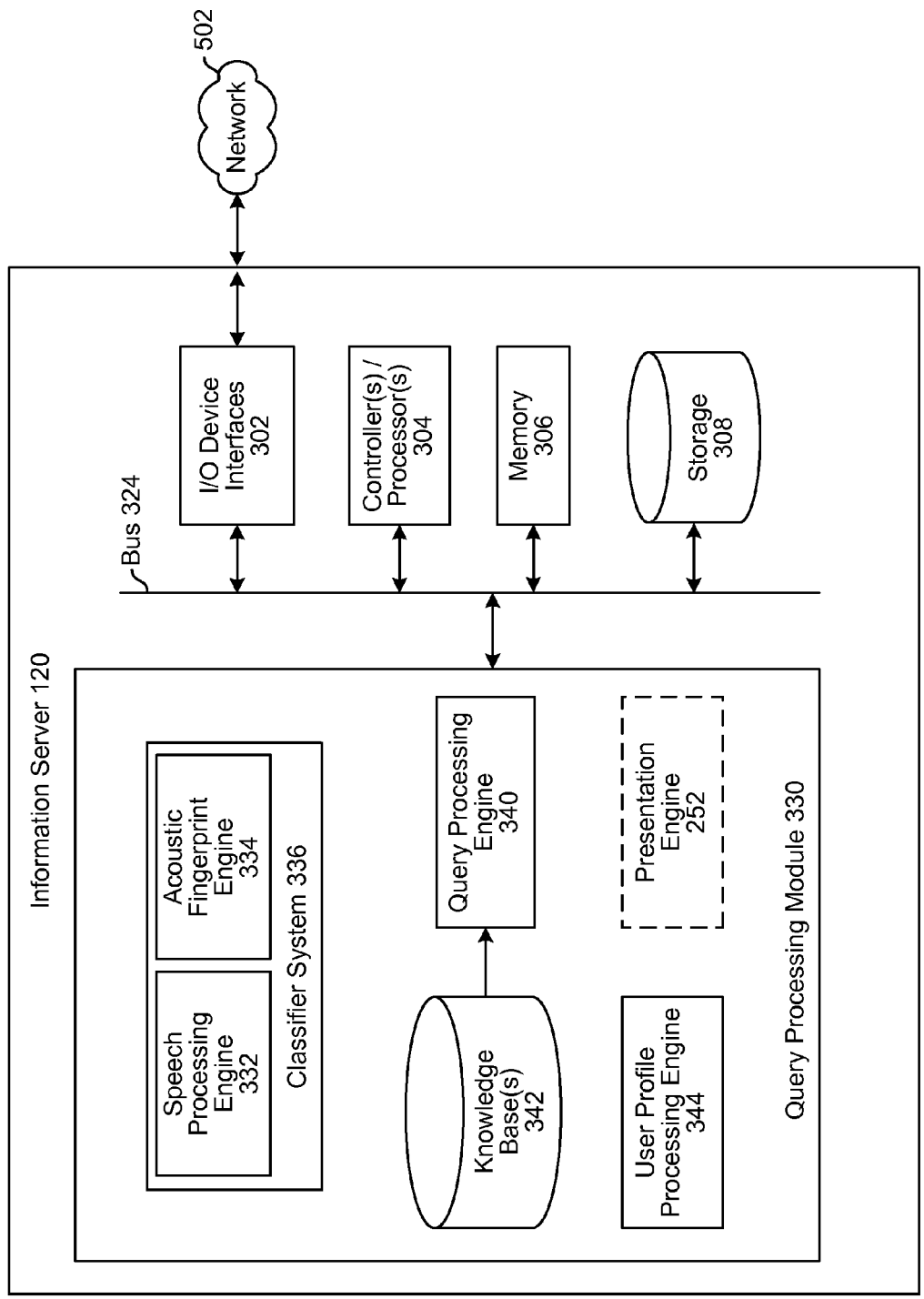
FIG. 3 is a block diagram conceptually illustrating example components of an information server for that may be included in the system.

FIGS. 2 and 3 illustrate block diagrams conceptually illustrating components of the system 100. Depending upon how the system 100 is structured, some of components shown in FIG. 3 as part of server 120 may be included in the user device 110, and some of the components shown in FIG. 2 as part of user device 110 may be included in the server 120. In operation, the system 100 may include computer-readable and computer-executable instructions that reside in storage 208/308 on the user device 110 or server 120.

User device 110 and server 120 may be any computing devices, or a collection of computing devices, and are referred to herein as "user device" and "server" to facilitate understanding based upon a prevalent system architecture. Other arrangements are possible, such as dividing or sharing the functionality of components of the user device 110 and the server 120 across multiple different device. Also, a same server 120 may serve different user devices 110 having differing capabilities, such that the server 120 may provide different functionality to difference client devices depending upon the capabilities of the individual client devices.

Each of the device 110 and the server 120 may include one or more controllers/processors 204/304 comprising one-or-more central processing units (CPUs) for processing data and computer-readable instructions, and a memory 206/306 for storing data and instructions. The memory 206/306 may include volatile random access memory (RAM), non-volatile read only memory (ROM), non-volatile magnetoresistive (MRAM) and/or other types of memory. The device 110 and the server 120 may also include a data storage component 208/308 for storing data and processor-executable instructions. The data storage component 208/308 may include one or more non-volatile storage types such as magnetic storage, optical storage, solid-state storage, etc. The device 110 and server 120 may also be connected to a removable or external non-volatile memory and/or storage (such as a removable memory card, memory key drive, networked storage, etc.) through the input/output device interfaces 202/302.

Executable instructions for operating the device 110, the server 120, and their various components may be executed by the controller(s)/processor(s) 204/304, using the memory 206/306 as temporary "working" storage at runtime. The executable instructions may be stored in a non-transitory manner in non-volatile memory 206/306, storage 208/308, or an external device. Alternatively, some or all of the executable instructions may be embedded in hardware or firmware in addition to or instead of software.

Referring to FIG. 2, the system 100 may include a variety of sensors such as those illustrated with device 110. Among the sensors are an audio capture component such as microphone(s) 220, an image and/or video capture component such as camera(s) 216, an antenna 222, and global positioning sensors 262. Several of each of these components may be included. The device 110 may also include user interface components such as a display 212 and a touch interface 214. Although shown as integrated within device 110, some or parts of the various sensors and user interface components may be external to device 110 and accessed through input/output device interfaces 202.

The antenna 222 and related components (e.g., radio transmitter/receiver, transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 220 or array of microphones, a wireless headset (e.g., 521 in FIG. 5), a wired headset (e.g., 522 in FIG. 5), etc. If an array of microphones is included, approximate distance to a sound's point of origin may be performed through acoustic localization based on time and amplitude differences between sounds captured by different microphones of the array.

The touch interface 214 may be integrated with a surface of a display 212 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 262 provides an interface for acquiring location information, such as information from satellite geographic positioning system(s). For example. the global positioning module 262 may include a Global Positioning System (GPS) receiver and/or a Global Navigation Satellite System (GLONASS) receiver. The global positioning module 262 may also acquire location-based information using other radio sources (e.g., via antenna 222), such as mapping services that triangulate off of known WiFi service set identifiers (SSIDs) or cellular towers within range of the device 110.

Examples of other sensors include an electronic thermometer to measure ambient temperature, a proximity sensor to detect whether there is an object within a certain distance of the device 110, and a physical button or switch that may be used to by the user 10 to signal the system 100 (e.g., to signal that an utterance is a question).

Sensors may be communicatively coupled with other components of system 100 via input/output (I/O) device interfaces 204 and/or via an address/data bus 224. The address/data bus 224 conveys data among components of the device 110. Each component within the device 110 may also be directly connected to other components in addition to (or instead of) being connected to other components across the bus 224.

The I/O device interfaces 202 may connect to a variety of components and networks. Among other things, the I/O device interfaces 202 may include an interface for an external peripheral device connection such as universal serial bus (USB), FireWire, Thunderbolt or other connection protocol. The input/output device interfaces 202 may also support a variety of networks via an Ethernet port and antenna 222.

The video output component of user device 110 such as display 212 may be used as a user interface via which the answer is output (128 in FIG. 1), and for displaying images and media (e.g., movies, books, etc.) The video output component may be a display of any suitable technology, such as a liquid crystal display, an organic light emitting diode display, electronic paper, an electrochromic display, a pico projector, etc. The video output component may be integrated into the device 110 or may be separate.

The system 100 may also include an audio output component such as a speaker 218, a wired headset, or a wireless headset. Other output devices include a haptic effect generator (not illustrated). The haptic effect generator may be of any haptics technology, including technologies to vibrate the entire device 110 (e.g., electromagnetic technologies such as vibratory motor or a coil with a central mass) and/or may comprise technologies allowing the haptic effect to be localized to a position of the touch interface 214, such as electroactive polymers, piezoelectrics, electrostatics, subsonic audio wave surface actuation, etc.

As discussed above, device 110 include controller(s)/processors 204, memory 206, and storage 208. In addition, the device may include a reference query capture module 230 and a reference query response module 250, which may be part of a software application running in the foreground and/or the background on the device 110

The reference query capture module 230 captures questions input by the user 10, using speech processing and/or text entry, as well as gathering context information from the sensors, from other applications running on the device, and from other independent devices in a network neighborhood. Context information may be periodically gathered and transmitted to the server 120 prior to receiving a question.

A classifier system 234 of the reference query capture module 230 processes captured audio. The speech processing engine 232 of classifier system 234 may perform speech recognition and natural language processing (NLP), using speech models and heuristics stored in storage 208. The classifier system 234 may comprise, for example, a Support Vector Machine (SVM), although other machine learning techniques might be used instead of or to augment SVM. The classifier system may utilize Hidden Markov Models (HMMs), Gaussian Mixture Models (GMMs), Mel-Frequency Cepstrum Coefficients (MFCCs), perceptual linear predictive (PLP) techniques, neural network feature vector techniques, linear discriminant analysis, semi-tied covariance matrices, etc. Heuristics used to identify whether an utterance is a question, and to interpret an identified question for resolution may be performed as an NLP function of speech processing engine 232.

The NLP component of the speech processing engine 232 may also be used to interpret typed queries. NLP may be used to analyze and tag/format the text for subsequent processing and interpretation. NLP, question recognition, and question interpretation may be based on heuristics and models stored in storage 208. Such models and heuristics may be grammar based, rule based, or constructed in a different manner.

The automatic speech recognition (ASR) component of speech processing engine 232 may also be configured to translate slang terminology, abbreviated terms, synonyms, and other queries into textual expressions that can be understood and used by the query processing unit 340 of the server 120.

How speech processing functionality is divided between the user device 110 and the server 120 depends upon how the components of system 100 are configured and their computational capabilities. For example, both speech recognition and natural language processing may be performed entirely on the user's device 110, entirely on the server 120, or some division of functionality in-between, such as performing speech recognition on the user's device 110 but performing natural language processing on the server 120 (e.g., having speech processing engine 332 of the server 120 perform NLP).

An acoustic fingerprint encoder 236 of the reference query capture module 230 samples audio captured by the microphone(s) 220 and encodes the audio for processing an acoustic fingerprint engine 334 of a classifier system 336 on the server 120 to identify context. Encoding the audio samples reduces the volume of data shared between the user device 110 and the server 120. However, raw audio may also be sent by the reference capture module 230 for processing on the server 120. Front-end filtering used by the acoustic fingerprint encoder 236 may be different from that used by classifier system 234, such as using a low-pass filter for filtering speech processed by speech processing engine 232 and using a high-pass filter for encoding acoustic fingerprints.

A services discovery engine 238 of the reference query capture module 230 queries nearby devices in the network neighborhood, as well as determining what software applications the user 10 is currently using on the user device 110 itself, what applications are in the foreground, and what content is currently being provided to the user 10. Devices and applications may be queried for content information and metadata via various application and operating-system level interfaces. The service discovery engine 238 may use a zero-configuration networking protocol to discover nearby devices that may have contextual information, such as the service location protocol (SLP).

Aspects of the services discovery engine 238 may also exist on the server 120, or the services discovery engine 238 may exist entirely on the server 120. For example, the server 120 may check for pre-registered devices associated with a network address (e.g., Internet-Protocol address) at the same location as the user device 110, with the server 120 querying the other devices directly.

A search processing engine 240 of reference query capture module 230 transmits a question captured by classifier system 234 to the query processing engine 340 on the server 120. Depending upon the distribution of processing functionality, the query processing engine 340 may transmit a captured utterance, recognized text of a captured utterance, an utterance processed with NLP and/or identified as a question, an interpreted captured question, or text of a keyed-in question.

The reference query response module 250 includes a presentation engine 252 for outputting the answer to the user.

Examples of the presentation engine 252 may include a user interface component of a software application and a web browser.

Depending upon how functionality is divided, aspects of the presentation engine 252 may also be located on the server 120. For example, if the answer is to be output as synthesized speech and the presentation engine 252 on the user's device handles preparation of output, the query processing engine 340 of the server 120 may send answer information to the presentation engine 252 on the user's device 110 and have the user's device synthesize the speech output. However, this preparation of the output could also be prepared by aspects of the presentation engine 252 located on the server 120, sending the presentation engine 252 on the user's device 110 synthesized speech read to be output. Similar divisions of output preparation between the user's device 110 and server 120 also apply to text and graphical output.

Referring to FIG. 3, the server 120 is connected to a network 502 via input/output device interfaces 302. The input/output device interfaces 302 may also include an interface for an external peripheral device connection such as universal serial bus (USB), FireWire, Thunderbolt or other connection protocol. The input/output device interfaces 202 may connect to one or more networks 502 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The server 120 may include an address/data bus 324 for conveying data among components of the server 120. Each component within the server 120 may also be directly connected to other components in addition to (or instead of) being connected to other components across the bus 324.

The server 120 further includes a query processing module 330 that determines content and answers received questions. The query processing module 330 receives information from sensors on the device 110 and resolves received questions. The query processing engine 340 comprises an inference engine, applying information stored in knowledge base(s) 342 to resolve received questions. Query processing engine 340 may utilize knowledge stored in knowledge base(s) 342, as well as additional databases, to determine facts related to a query. Contextual facts provided by the search processing engine 240 and services discovery engine 238 may be applied by the query processing engine 340 to resolve a query, such as cross-referencing a location of the user device 110 as determined by the global position interface 262 with a programming schedule for television at the user's location. Fact relating to the user may likewise be acquired and processed.

The query processing module 330 includes a classifier system 336 comprising a speech processing engine 332 and an acoustic fingerprint engine 334. As noted above, the question forming the basis for a knowledge base search query may be a textual input or an audio speech input. The speech processing engine 332 may identify and interpret user questions, as discussed above with speech processing engine 232. Acoustic fingerprint engine 334 compares captured audio from reference query capture module 230 to identify audible media. If images or video are provided by the reference query capture module 230, the classifier system 336 may also perform image processing to determine context information. The classifier system 336 of the server 120 may use the same or similar techniques to those described with the classifier system 234 of the user device 110, and speech recognition techniques, the acoustic fingerprints, and image processing may utilize the same or similar pattern recognition techniques but with different models, or may use different techniques altogether. Acoustic fingerprints, speech processing models, image processing models, rules, and heuristics may be stored in the knowledge base(s) 342, in storage 308, or in some other library or database.

Interpreting and resolving a question on either the user device 110 or the server 120 may include accessing the knowledge base 342 and/or query processing engine 340.

The knowledge base 342 may include facts and their ontology structured using various classifiers relating to different types of compositions that may be basis for questions. This allows for efficient searching, identification, and return of facts to resolve questions into specific answers. Once the question has been processed, the query processing engine 340 sends the result to the device 110 to be output by the presentation engine 252.

Components of the query processing module 330, such as the speech processing engine 332, the knowledge base 342, and the query processing engine 340, may be part of a knowledge representation system, for example, the Incorporated Knowledge System.

The natural language component of the speech processing engine 332 may perform translation between natural language and internal representations, as described in the Incorporated Knowledge System documents. For example, the natural language component may translate or parse a query into one or more corresponding classes, relations, data/document objects, facts, time, negative facts, categories, etc. The natural language component may identify and interpret a captured utterance, processing a question received from a user 10 into a query format readable by the inference engine of the query processing engine 340. The natural language component of the speech processing engine 232 may provide this same functionality, or the functionality may be divided between speech processing engines 232, 332.

The query processing engine 340 may cause retrieval of knowledge from various knowledge bases 342 and databases, such as the knowledge base(s) described in the Incorporated Knowledge System documents. The query processing engine 340 may reference information that is either located on the server 120 or in a variety of different locations through multiple application programming interfaces (APIs), utilizing protocols supported by the respective source of information.

A user profile processing engine 344 of the query processing module 330 may process settings input by the user and other profile information associated with a user 10 of device 110 and/or device 110 itself, and pass this information to the query processing engine 340. For example, the query processing engine 340 may receive the query from the natural language component of the speech processing engine 232/332, and apply the user profile information to the query using the knowledge base(s) 342 to obtain one or more results that satisfy the query. For example, a user may specify whether the query processing engine 340 is authorized to acquire and/or utilize information about the user's media purchase history when determining possible contexts for question resolution.

The knowledge base(s) 342 may be populated with patterns (e.g., acoustic fingerprints, image data) and facts from one or more databases. This information may be generalized, but may also be time, chapter, or scene indexed to facilitate resolution of contextual ambiguity. Third-party databases may also be queried for facts and added to knowledge base(s) 342, or queried on-demand. The knowledge base(s) 342 may be static, dynamic, or have multiple parts some of which are static and some of which are dynamic. The knowledge or information in the knowledge base(s) 342 may be stored in a structured form, such as a form described in the Incorporated Knowledge System documents. For example, the knowledge in the knowledge base(s) 342 may be structured using various classifiers, such as objects, recognition data, relations, classes, data/document objects, facts, time, negative facts, the golden rule, categories of knowledge, etc. such as described in the Incorporated Knowledge System documents.

In addition to using acoustic fingerprints to determine contextual information, the classifier system may use techniques such as face recognition to identify a face in view of a camera or cameras 216 on the user device 110. For example, if the camera captures a face on a television 136, face matching may be used to identify an actor to determine a face (e.g., the actor's name). As noted above, the acoustic fingerprints and image pattern data used to identify media, people, etc., may be stored in knowledge base 342, in storage 308, or in some other database. If the information used by the other database is not in the format used for facts by the query processing engine 340, the classifier system 336 may translate the fact data into a format for the query processing engine 340.

All or a part of the knowledge base(s) 342 may be continuously or periodically updated to add new or additional facts and context-identifying information, as well as current programming schedules, metadata, and other time-dependent contextual information. Time-dependent contextual information may be maintained in a dynamic part of the knowledge base, populated with and continuously updated with information from one or more separate databases.

If acoustic localization is performed and/or proximity detection, adaptive filtering may be applied to determine whether the origin of an utterance is the user 10 or some other source. Likewise, techniques such as speaker recognition may be applied to distinguish between questions originating with user 10 and utterances captured from other sources.

Query processing engine 340 may also keep a time-indexed record of what context was determined when resolving prior user questions. The time-index may be used, in part, by the query processing engine 340 to determine the immediacy (e.g., freshness) of a context. In addition, the presentation engine 252 on the user device 110 may provide an interface (e.g., a virtual button) for the user 10 to signal that the query processing engine 340 has the wrong context, providing the query processing engine 340 to try to resolve other contexts. The query processing engine 340 may also provide the user 10 multiple contexts to choose from if an initial attempt or attempts to resolve the question was unsuccessful.

The knowledge base(s) 342 may be loaded with facts to respond to questions relating to a wide variety of different types of media. Other topics may also be included such as products (e.g., answering user questions about products they are identified as having purchased).

The query processing engine 340 may cross-reference facts to resolve queries, using rules and heuristics to generate resolvable sub-queries. So, for example, if a video is being played and the services discovery engine 238 reports the title and scene, or captured audio or video is used by the classifiers system 336 to determine title and scene, questions such as where the scene was shot, who is in the current scene, what characters (as opposed to actors) are in the current scene, then the semantic objects present in the question may be sufficient to tie the questions to the ontology, facts, and other information in the knowledge base(s) 342. However, if a user asks a question such as "what other movies has this actor been in?" resolving the query may require not just identifying the actor based on context, but may require cross-referencing the actor with a list of movies if the movie database does not link an actor to every movie in which they appeared. Similarly, if there is a scene where music is playing and the user asks "who is the drummer?" then in addition to recognizing the composition, the composition could be cross-referenced, reframing a query using a mix of original and resolved semantic information to determine who is the drummer in this band, what album the composition is from, the meaning of the lyrics, and other questions that may require multiple queries to resolve, with each query resolving part of whatever ambiguity is identified.

The system may also process text, such as closed captioning or subtitles of a program being viewed by a user, or text from an e-book the user recently read. For example, the user device 110 detects text from a program including a discussion about travel to a particular city, and the user queries the user device with the question "where is that?" the system may analyze the recent text (for example, subtitles or closed captioning) to find semantic entities with a location and then answer the question.

Factual information may also be derived from the user's choice of words. For example, if both a male actor and female actor appear in a current scene, a user's use of the word "actress" may be used to identify gender. If the actors' entries in the knowledge base(s) 342 do not include an indication of gender, the names of the persons identified in the current context may be compared with lists of names tied to gender to determine which actor is more likely female. In some languages other than English, other grammatical aspects might be used for the same purpose, such as a masculine or feminine form of a words being included in the question. Either query module 230 or 330 may also note a user's propensity to use certain words to resolve ambiguity. For example, if a user has used gender-specific words such as actor and actress, then a question stating "actor" may be automatically assume to refer to the masculine. Such pattern recognition may be based on, among other things, machine learning technique.

Figure 4:
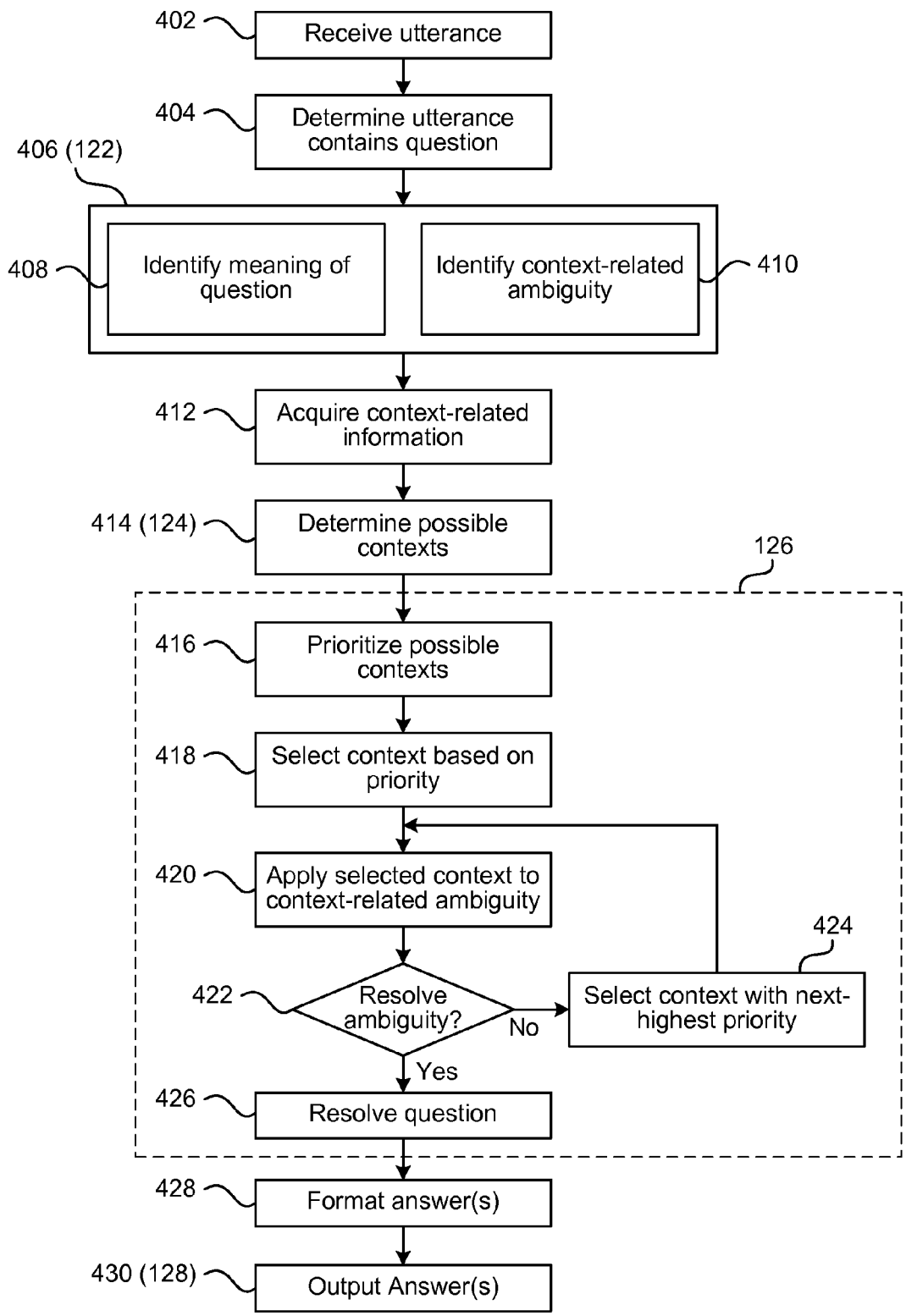
FIG. 4 is a flow diagram adding additional details to an example of the process performed by the system in FIG. 1.

FIG. 4 is a more detailed example of a process that may be performed by the system 100. This example uses speech processing and question recognition to identify the question, such that the system may be continually listening. However, as noted above, the user 10 may provide a signal to identify that a question follows or enter the question as text.

The system monitors an audio input device(s) at the user device 110 such as microphone 220 to capture user utterances. After an utterance is received (402), the speech processing engine 232/332 processes it to determine (404) that the utterance contains a question (e.g., based on an interrogative sentence structure, word, or particle, and/or the use of an inflected verb form).

The question is then interpreted (406/122), creating a semantic representation by converting the question into a symbolic construct for processing. This includes identifying (408) the meaning of the question and identifying (410) context-related ambiguity.

The query processing engine 340 acquires (412) context-related information, such as information provided by the acoustic fingerprint encoder 236, by the services discovery engine 238, by the various sensors accessible to the user device 110 such as the microphone 220, camera 216, and global positioning interface 262, by other applications and/or the operating system on running on the controller(s)/processor(s) 204, and by databases and knowledge base(s) 342 containing information about media that the user may own or have accessed. User profile information from the user profile processing engine 344 may restrict which resources are accessed when acquiring context-related information.

The query processing engine 340 then determines (414/124) possible contexts based on the acquired information. Among other things, this may include information from the classifier system 336 identifying audio media or captured images based on sensor data or encoded acoustic fingerprints provided by user device 110. If multiple possible contexts are identified, the query processing engine may prioritize (416) them based on, among other things, heuristics assigning different context sources and/or different levels of immediacy or other factors.

Examples of how immediacy may be determined include applying a set of heuristics to prioritize context based on a defined context hierarchy (e.g., if a question may be resolved for both a scene in a movie audible at the user's location and a scene in a book the user recently purchased, the context information for the movie may have greater immediacy), based on physical proximity of the user to the media source (e.g., using acoustic localization to approximate a distance between the user's device 110 and an audible source such as speakers 134 in FIG. 1), based on how recently in time a user is known to have interacted with a media source (e.g., if a user has an e-book open on user device 110, does the quantity of time that has transpired since the user last changed pages indicate that the user is actively reading), and based on the context of other recently asked questions (e.g., if possible contexts for recent questions have included a movie playing on the television 136 and an e-book on user device 110 but resolved as being related to the e-book, and those same contexts are still possible candidates for a new question, then the prioritization of contexts may be biased to favor the e-book). Pattern recognition techniques may also be applied.

The query processing engine 340 then selects (418) the highest-priority context and applies (420) the selected context to the context-related ambiguity. If the ambiguity does not resolve for the selected context (422 "No"), the query processing engine 340 selects (424) the context with the next-highest priority and tries again to resolve the ambiguity.

In some cases, for the same context, there may be more than one solution to the context-related ambiguity. For example, if the user 10 asks "who is that actor on the screen" and there are multiple actors, each may resolve the ambiguity. In such cases, the query processing engine 340 may apply heuristics to cull the list of potential resolutions for the ambiguity. For example, if the user profile indicates that an actor in the scene is a favorite of the user 10, that is unlikely to be the actor the user 10 is asking about. In comparison, if the actor is appearing for the first time in the current scene, it is more likely to be the actor the user 10 is asking about. Examples of other factors include such indicia as how "important" the actor is based on a database ranking of actors, whether the actor is known to have appeared in other media that the user 10 is known to have watched, whether the user 10 has asked about the actor before, whether the actor is a "marquee" actor in the movie or program, etc. Probabilities are generated based on such indicia to determine a likely subject of the user's inquiry. If more than one candidate subject has a similarly high probability of being the subject that resolves the ambiguity, the query processing engine 340 may proceed to resolve the question for more than one candidate subject, such that more than one answer may be output.

After a selected context does resolve the context-related ambiguity (422 "Yes"), the query processing engine 340 applies available facts to the processed query to resolve (426) the original question.

Either the query processing engine or 340 or the presentation engine 252 formats (428) the answer(s) based on the results of resolved question (426), translating the result into answer(s) that are presented in conversational language. Among other things, this may include applying a defined grammar framework based on the grammar and words appearing in the original question. The applied grammar framework may be chosen in part on the format of the expression resulting from interpreting the question (406/122). The presentation engine 252 then outputs (430/128) the answer(s) at the user device 110. Other related information may also be output.

The processes illustrated in FIG. 4 may be performed in a different order than that illustrated. For example, receipt of the utterance (402) and acquiring of context-related information (412) may be performed in any order (e.g., at the same time, and/or with ongoing/periodic/continual acquisition of information used to determine context, which at some point includes the utterance containing the question). As another example, determining possible context (414/124) may be performed in advance of receiving the utterance (402). As another example, as noted above, rather than resolving the question based on context and facts (126) in an iterative fashion based on a prioritization (416) of possible context based on factors such as immediacy, the query processing engine 340 may attempt to resolve contextual ambiguity for multiple contexts at a same time, and then select the context resolves with the NLP-meaning weight that most closely matches the meaning associated with the rest of the question. If multiple contexts produce similarly weighted results, other heuristics such as those used to prioritize possible contexts (416) may be applied to narrow the solution set, factoring in immediacy and user profile information (e.g., comparing known interests of the user with aggregate user profiles to determine commonality of interest).

The above system is describe in the context of questions and/or inquiries, however other user inputs, such as commands, may also include ambiguities that the system may be configured to resolve so that the command may be properly executed. For example, if a user says to a user device while watching a television program "show me a list of other shows starring that actress," the described system (either on its own or in conjunction with one or more other systems) may be used to resolve the ambiguity and execute the user's command. Also, while the user's inquiry is discussed as being a spoken or written natural language inquiry, the inquiry may be formatted in a different manner, and need not be a natural language inquiry. For example, the user 10 might take a photograph of a scene or a character in a scene on the display 212, and send that to the query processing engine 340 as an inquiry.

Multiple user devices 110 and servers 120 may be employed in a single system 100. In such a multi-device system, each of the user devices 110 and servers 120 may include different components for performing different aspects of context identification and query processing. The multiple devices may include overlapping components. The components of user device 110 as illustrated in FIG. 2 is exemplary, and may be a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Figure 5:
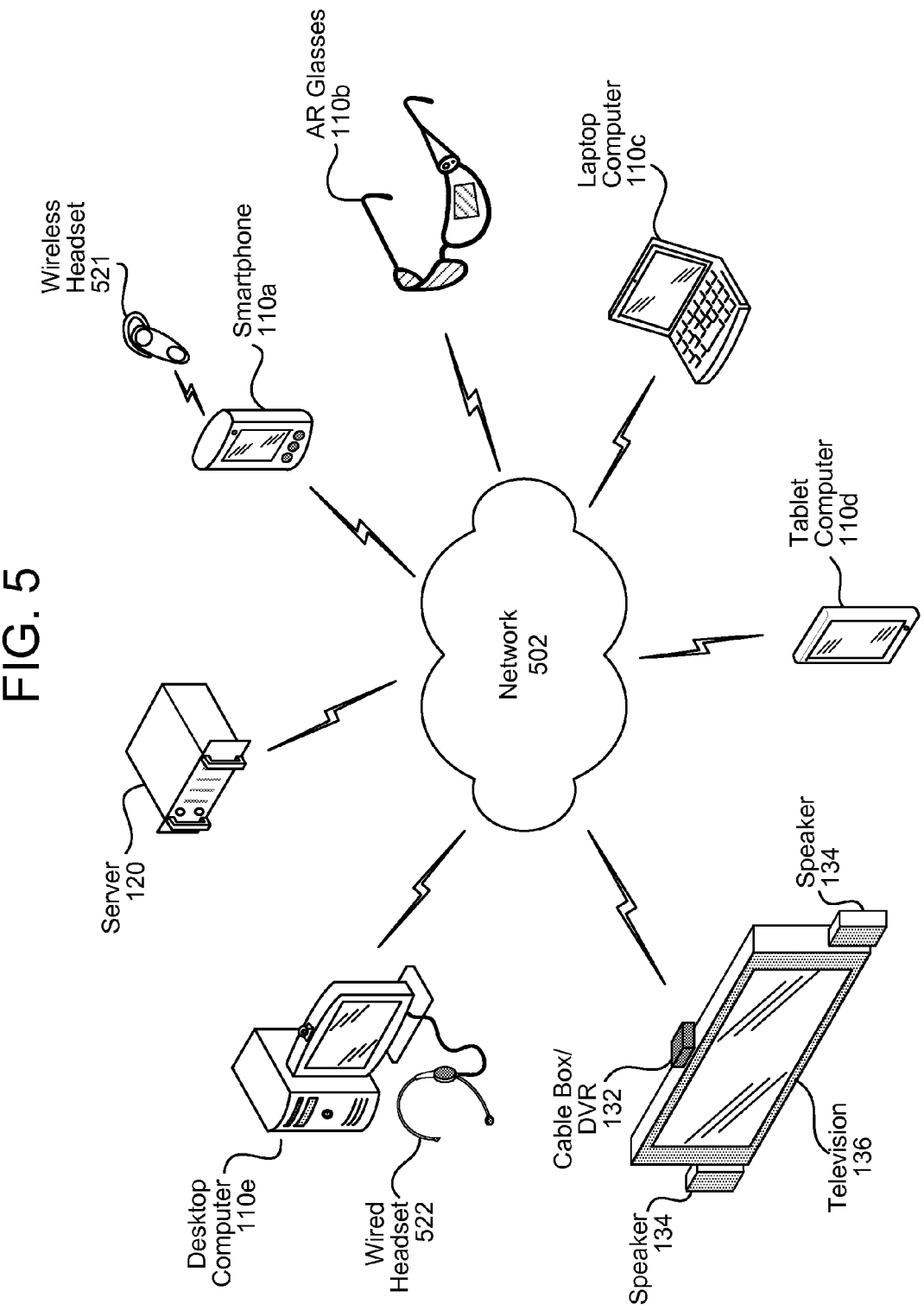
FIG. 5 illustrates an example of a computer network for use with the system.

As illustrated in FIG. 5, multiple devices (user devices 110a to 110e, server 120, cable box/DVR 132) may contain components of the system 100 and the devices may be connected over a network 502. For example, each of smart phone 110a, augmented reality (AR) glasses 110b, laptop computer 110c, tablet computer 110d, desktop computer 110e, and cable box/DVR 132 may include components of the reference query capture module 230 and the reference query response module 250, as well as components of the query processing module 330. The computational capabilities of individual the devices (110a to 110e and 130) may range from significant (e.g., rivaling that of the server 120) to being a "dumb" terminal with comparatively rudimentary capabilities (e.g., basic input-capture, output, and networking capabilities).

Network 502 may include a local or private network or may include a wide network such as the internet. Networked devices may capture and output audio through a number of audio input devices such as headsets 521, 522 and speakers 134. These audio capture and output devices may be connected to networked devices either through a wired or wireless connection. Networked devices may also include embedded audio input devices and output devices, such as an internal microphone and speaker that are not illustrated in FIG. 5.

The user device 110 may connect to and communicate with different media devices using different types of networks (e.g., WLAN, Bluetooth, LTE, etc.), In addition, if a media device is accessing network-based "cloud" services provided by server(s) 120 and/or sending updates to the server(s) 120, the user device 110 may acquire context information about the media device without any direct communication with the media device. For example, one the user device 110 and the media device may communicate with the server(s) 120 via a WLAN Internet access point, whereas the other may communicate with the server(s) 120 via a cellular data service (e.g., LTE). Based on an identifier associated with the media device (e.g., network address, device name, etc.) or the user 10 of the media device, and subject to user privacy settings, the user device 110 may query the server 120 for context information about the media device without direct device-to-device or device-to-network-to-device communication. Additional information may also be provided in a same manner, such as the physical location of the media device as approximated by the servicing network (e.g., the cellular network), the location of the access point used by the media device (e.g., cellular tower, repeater, WiFi router), geographic coordinates provided by the media device itself, etc.

The above examples are meant to be illustrative. They were chosen to explain the principles and application of the disclosed system and are not intended to be exhaustive or to limit the disclosure. Many modifications and variations of the disclosed system may be apparent to those of skill in the art. Persons having ordinary skill in the field of knowledge representation systems, expert systems, inference engines, and natural language processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines and components of reference query capture module 230, reference query response module 250, and query processing module 330 may be implemented as firmware or as a state machine in hardware. For example, at least the acoustic fingerprint encoder 236 of the reference query capture module 230 may be implemented as an application specific integrated circuit (ASIC) or a digital signal processor (DSP), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving a user question from a user's computing device;
   processing the question to convert the question into a machine readable form;
   identifying an ambiguity in the question;
   acquiring, from the user's computing device, context-related information relating to media being output at the user's location including one or more of:
   information about media being output by the user's computing device, information about media being output by one or more other sources in communication with the user's computing device, or
   information from one or more sensors of the user's computing device; determining a plurality of possible contexts of the question based on the context-related information, the plurality of possible contexts including a first possible context and a second possible context;
   determining a first fact from a knowledge base for the first possible context; determining, by an inference engine, that the first fact does not resolve the ambiguity; determining a second fact from the knowledge base for the second possible context; determining, by the inference engine, that the second fact does resolve the ambiguity; determining an answer to the question using the second fact; and
   outputting the answer to the question to the user's computing device.

2. The method of claim 1, wherein:
   the information from the one or more sensors comprises audio captured by a microphone, and
   determining the second possible context of the question is based on the captured audio matching an acoustic fingerprint associated with a media item.

3. The method of claim 1, further comprising: capturing an utterance at the user's computing device; processing the utterance to convert speech in the utterance into text; and
   identifying the question based at least in part on at least one of the speech or the text.

4. The method of claim 1, wherein the media comprises a first media and a second media, the first possible context being based on acquired context-related information relating to the first media and the second possible context being based on acquired context-related information relating to the second media, and wherein the first media and the second media are being output at the user's location, and
   the ambiguity in the question is resolved based on the second fact after the inference engine fails to resolve the ambiguity based on the first fact.

5. A computing system comprising: at least one processor;
   at least one memory including instructions operable to be executed by the at least one processor, the instructions configuring the at least one processor to:

receive a question expressed in natural language from a first device at a first location;

process the question to convert the question into a machine readable form; identify an ambiguity in the processed question;

acquire information relating to media being output at the first location, the media including at least one of a first media being output by the first device or a second media being output by a second device;

determine a plurality of possible contexts of the question based at least in part on the media being output at the first location, the plurality of possible contexts including a first possible context based on the first media and a second possible context based on the second media;

determine a first fact from a knowledge base for the first possible context; determine that the first fact does not resolve the ambiguity;

determine a second fact from the knowledge base for the second possible context;

determine that the second fact does resolve the ambiguity; determine a response to the question using the second fact; and output the response to the question.

6. The computing system of claim 5, wherein the acquired information includes information from one or more sensors of the first device.

7. The computing system of claim 6, wherein the acquired information from the one or more sensors is based on audio that is audible at the first location, and wherein the at least one processor is configured to determine the second possible context of the question by identifying an acoustic fingerprint substantially matching the audible audio, the acoustic fingerprint associated with a media item.

8. The computing system of claim 6, wherein the acquired information from the one or more sensors is based on an image or video captured at the first location, and wherein the at least one processor is configured to determine the second possible context of the question by processing the image or video.

9. The computing system of claim 5, wherein the first possible context is based on the acquired information relating to first media and the second possible context is based on the acquired information relating to the second media, the first and second media being different, wherein the instructions configure the at least one processor to determine the second fact and to determine that the second fact does resolve the ambiguity in response to having determined that the first fact does not resolve the ambiguity.

10. The computing system of claim 9, wherein the instructions further configure the at least one processor to prioritize the first media above the second media, the instructions configuring the at least one processor to determine the first fact does not resolve before determining that the second fact does resolve the ambiguity based on a priority of the first media being above the second media.

11. The computing system of claim 5, wherein the question is received as an utterance captured by the first device, and wherein the instructions to process the question to convert the question into machine readable form further configure the at least one processor to:

process the utterance to convert speech in the utterance into text; and determine that the text comprises the question.

12. The computing system of claim 11, wherein the instructions further configure the at least one processor to:

communicate with a third device to acquire the information relating to media, the third device being at a second location remote from the first location, and having received the information from at least one of the first device or the second device.

13. The computing system of claim 5, wherein the at least one processor determines that the first fact does not resolve the ambiguity using an inference engine, and the at least one processor determines that the second fact does resolve the ambiguity using the inference engine.

14. The computing system of claim 5, wherein the instructions further configure the at least one processor to:

maintain a time-indexed record of what contexts were determined to resolve prior questions; and prioritize the plurality of possible contexts based at least in part on how recently each possible context was determined to have resolved a prior question, as indicated in the time-indexed record, wherein, based on a priority of the plurality of possible contexts, the instructions configure the at least once processor to determine that the first fact does not resolve the ambiguity before determining that the second fact does resolve the ambiguity.

15. The computing system of claim 5, wherein the instructions further configure the at least one processor to:

acquire, from a user profile of a user associated with the computing device, additional information relating to a past purchase by the user of third media, the third media being different than the first media and the second media, wherein the instructions to determine the plurality of possible contexts further configure the at least one processor to base the determination on the additional information, the plurality of possible contexts further including a third possible context based on the third media; and based on the first media and the second media being output at the first location having greater immediacy than the past purchase, prioritize the plurality of possible contexts to give the first possible context and the second possible context higher priority than the third possible context, and wherein the instructions configure the at least once processor to determine, based on a priority of the plurality of possible contexts, that the first fact does not resolve the ambiguity before determining that the second fact does resolve the ambiguity.

16. A non-transitory computer-readable storage medium storing processor-executable instructions for controlling a computing device, comprising program code to configure the computing device to:

receive a question expressed in natural language from a first device at a first location;

process the question to convert the question into a machine readable form;

identify an ambiguity in the processed question;

acquire information relating to media being output at the first location, the media including at least one of a first media being output by the first device or a second media being output by a second device;

determine a plurality of possible contexts of the question based at least in part on the media being output at the first location, the plurality of possible contexts including a first possible context based on the first media and a second possible context based on the second media;

determine a first fact from a knowledge base for the first possible context; determine that the first fact does not resolve the ambiguity;

determine a second fact from the knowledge base for the second possible context;

determine that the second fact does resolve the ambiguity;
determine a response to the question using the second fact; and output the response to the question.

17. The non-transitory computer-readable storage medium of claim 16, wherein the acquired information includes information from one or more sensors of the first device.

18. The non-transitory computer-readable storage medium of claim 17, wherein the acquired information from the one or more sensors is based on audio that is audible at the first location, and
wherein the computing device is configured to determine the second possible context of the question by identifying an acoustic fingerprint substantially matching the audible audio, the acoustic fingerprint associated with a media item.

19. The non-transitory computer-readable storage medium of claim 17, wherein the acquired information from the one or more sensors is based on an image or video captured at the first location, and
wherein the computing device is configured to determine the second possible context of the question by processing the image or video.

20. The non-transitory computer-readable storage medium of claim 16, wherein the first possible context is based on the acquired information relating to first media and the second possible context is based on the acquired information relating to the second media, the first and second media being different,
wherein the program code configures the computing device to determine the second fact and to determine that the second fact does resolve the ambiguity in response to having determined that the first fact does not resolve the ambiguity.

21. The non-transitory computer-readable storage medium of claim 20, wherein the program code further configures the computing device to prioritize the first media above the second media, the instructions configuring the at least one processor to determine the first fact does not resolve before determining that the second fact does resolve the ambiguity based on a priority of the first media being above the second media.

22. The non-transitory computer-readable storage medium of claim 16, where the question is received as an utterance captured by the first device, and wherein the program code to process the question to convert the question into machine readable form further configures the computing device to:
process the utterance to convert speech in the utterance into text; and determine that the text comprises the question.

23. The non-transitory computer-readable storage medium of claim 22, wherein the program code further configures the computing device to:
communicate with a third device to acquire the information relating to media, the third device having received the information from at least one of the first device or the second device.

24. The non-transitory computer-readable storage medium of claim 16, wherein program code is to configure the computing device to determine whether the first fact and the second fact resolve the ambiguity using an inference engine.

25. The non-transitory computer-readable storage medium of claim 16, wherein the program code further configures the computing device to:
maintain a time-indexed record of what contexts were determined to resolve prior questions;
prioritize the plurality of possible contexts based at least in part on how recently each possible context was determined to have resolved a prior question, as indicated in the time-indexed record,
wherein the program code is to configure the computing device to determine, based on a priority of the plurality of possible contexts, that the first fact does not resolve the ambiguity before determining that the second fact does resolve the ambiguity.

26. The non-transitory computer-readable storage medium of claim 16, wherein the program code further configures the computing device to:
acquire, from a user profile of a user associated with the computing device, additional information relating to a past purchase by the user of third media, the third media being different than the first media and the second media, wherein the program code is to configure the computing device to determine the plurality of possible context further based on the additional information, the plurality of possible contexts further including a third possible context based on the third media; and
based on the first media and the second media being output at the first location having greater immediacy than the past purchase, prioritize the plurality of possible contexts to give the first possible context and the second possible context higher priority than the third possible context; and
wherein the program code is to configure the computing device to determine, based on a priority of the plurality of possible contexts, that the first fact does not resolve the ambiguity before determining that the second fact does resolve the ambiguity.

* * * * *